June 15, 1937. E. H. GRAUEL 2,083,949
DIFFERENTIAL GAUGE
Filed July 31, 1935
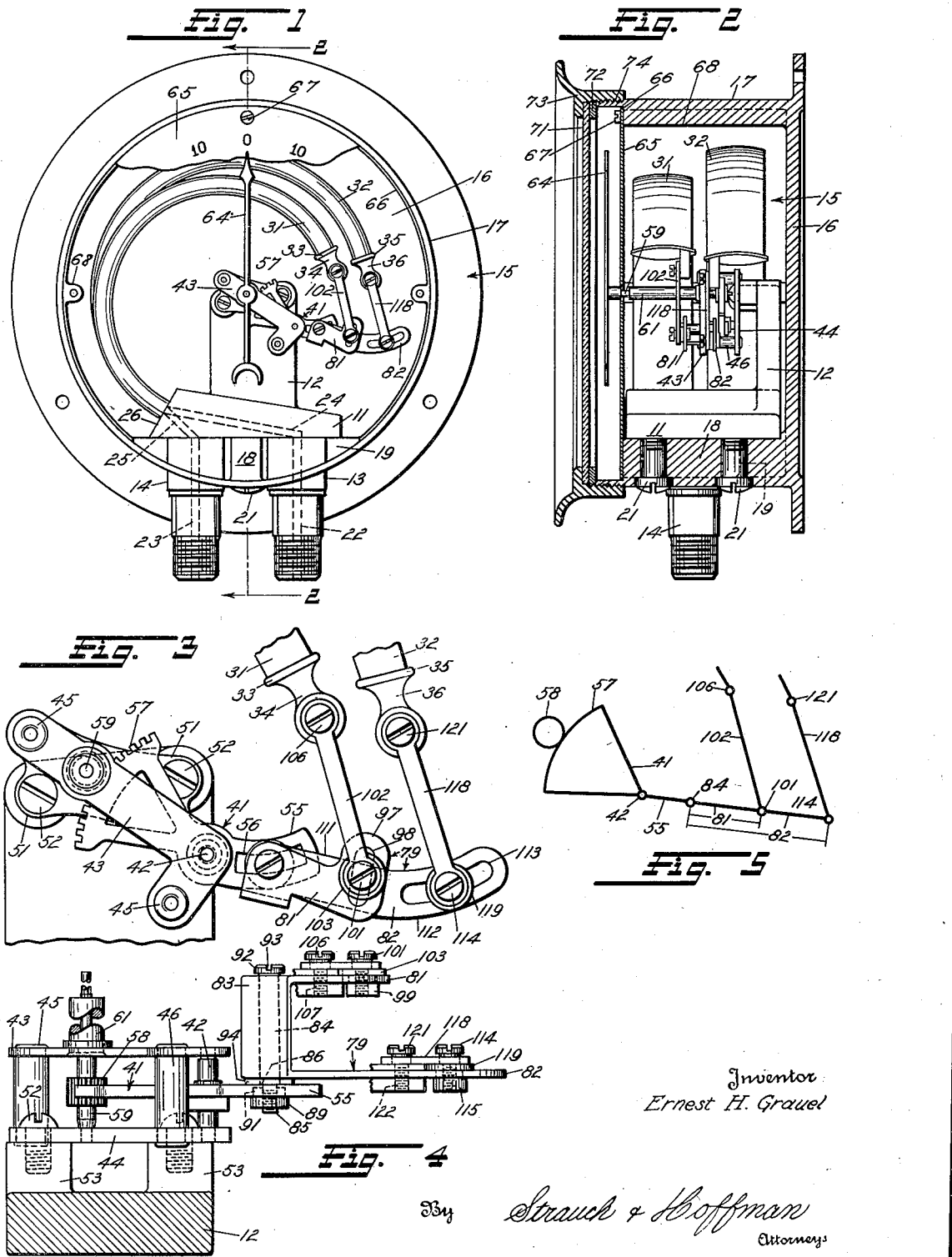
Inventor
Ernest H. Grauel
By Strauck & Hoffman
Attorneys Patented June 15, 1937

2,083,949

UNITED STATES PATENT OFFICE 2,083,949

DIFFERENTIAL GAUGE

Ernest H. Grauel, Perkasie, Pa., assignor to United States Gauge Company, New York, N. Y., a corporation of Pennsylvania Application July 31, 1935, Serial No. 34,098

9 Claims. (Cl. 73—109)

The present invention relates to improvements in differential gauges for indicating differences in pressure existing between separate fluid pressure sources, and more particularly is concerned with improvements in instruments for indicating pressure differentials existing between sources of relatively low fluid pressure.

One form of gauge mechanism designed to indicate pressure differences between separate fluid sources is disclosed in copending application Serial Number 26,277 for "Differential gauges" by Maximilian Klein and Bernhard Willach. The present invention comprises an improvement on the construction disclosed in the application referred to and is designed to provide a simplified construction having decreased internal friction and therefore increased precision and accuracy of indication.

A primary object of the present invention therefore resides in the provision of an improved and simplified differential gauge adapted particularly to indicate pressure differences between sources of low fluid pressure.

Another object of the present invention resides in the provision of a device of the above character having relatively few movable parts whereby economy of manufacture is promoted and more efficient and accurate pressure indication is assured.

Still a further object of the present invention resides in the provision of a gauge of the character described having pressure responsive devices of unequal reactive characteristics arranged to operate in either direction, each in opposition to the other and to give no indication when the several pressures are equal.

Still a further object of the present invention resides in the provision of a gauge of the character described wherein movement of the pressure responsive devices under the influence of pressure variations is transmitted directly to a single mechanically floating lever which is designed to directly cause actuation of the gauge indicator in proportion to the difference in pressure to which the pressure responsive devices react.

Further objects of the invention will appear in the following description and the appended claims, when viewed in light of the accompanying drawing, wherein:

Figure 1 is a front elevational view of a differential gauge embodying the present invention, the dial plate and observing glass being removed to expose the working parts of the gauge.

Figure 2 is a view in side elevation, with the dial and cover plate in position and the casing shown in vertical section, taken on line 2—2 of Figure 1.

Figure 3 is a fragmentary view on an enlarged scale of a part of the mechanism shown in Figure 1.

Figure 4 is a view in elevation as seen when observing Figure 3 from the bottom thereof.

Figure 5 is a diagrammatic showing in simplified form of the novel mechanism shown in Figure 3.

With continued reference to the drawing wherein like reference characters are employed to denote like parts, the preferred embodiment of my invention will be seen to consist of four general units—a base structure, a pressure responsive assembly mounted on the base structure, an indicator together with an indicator actuating device mounted on the base structure, and a pressure differentiating mechanism interconnecting the indicator actuating device and pressure responsive assembly.

As seen in Figures 1 and 2, the base structure is of a form conventional in the art and comprises a bracket or socket 11 provided with an upstanding arm 12 and dual depending tubular extensions 13 and 14. Bracket 11 is housed within a casing 15 having a flat back 16 and a cylindrical wall 17. Formed in the bottom of casing 15 and extending longitudinally along wall 17 is a projecting ledge 18 which merges into a transverse ledge 19 formed adjacent back 16 of casing 15. Ledges 18 and 19, which extend normally with respect to each other, form a T-shaped support upon which bracket 11 is designed to be secured, as by means of screws 21 extending upward through bores in ledge 18 and threaded into the bracket.

Tubular extensions 13 and 14 are arranged to depend from bracket 11, one on each side of ledge 18, and project through suitable apertures formed in casing wall 19. However, extensions 13 and 14 may depend from bracket 11 at any other suitable points without departing from the spirit or scope of the present invention. Provided in extensions 13 and 14 are bores 22 and 23 which at one end are designed to be placed in communication with separate fluid sources and at their other ends are placed in communication with bores 24 and 25, respectively, which are formed in bracket 11 and terminate in end face 26 of the bracket.

The pressure responsive assembly forming a part of the preferred embodiment of my invention includes dual pressure responsive Bourdon tubes 31 and 32 which are rigidly mounted on end face 26 of the bracket with the internal bores of the tubes in communication respectively with bores 24 and 25 formed in bracket 11.

As seen in Figures 1 and 2, the dual Bourdon tubes are of appreciably dissimilar size and diameter, the tube 31 being of a substantially smaller mean diameter than the tube 32. The tubes are further designed with correspondingly different reactive characteristics in order that unequal relative distortion of the tube will occur under the influence of equal pressure changes. Preferably the tube of smaller mean diameter is made of correspondingly less reactive sensitivity with the result that when the Bourdon tubes are simultaneously subjected to substantially equal pressure variations, the smaller tube 31 will suffer less distortion than the larger tube 32. Such construction of the Bourdon tubes is provided for a reason presently to be set forth.

The end of Bourdon tube 31 remote from its point of attachment to the bracket 11 is closed by a cap 33 which is provided with an apertured lug 34. Likewise, the free end of Bourdon tube 32 is closed by a cap 35 having an apertured lug 36. The apertured lugs 34 and 36 provide means for pivotally connecting the free ends of the Bourdon tubes to the differential evaluating mechanism presently to be described.

It will be appreciated that the pressure responsive assembly just described affords an improved construction by providing dual Bourdon tubes of unlike configuration and dissimilar pressure reactivities which features serve to promote the improved operation and pressure indication of the present invention in a manner presently to be set forth.

The indicator and indicator actuating device forming a part of the preferred embodiment of my invention are of conventional form and will be but briefly described. The indicator actuating device as seen in Figures 3 and 4 includes a lever or rocker arm 41 mounted on a pivot 42 which is journalled in parallel plates 43 and 44 designed to be assembled together by means of spacing sleeves 46 the reduced ends of which extend through plates 43 and 44 and are peened over as indicated at 45 to securely lock the plates with respect to the spacing sleeves. Plate 44 is provided with extension portions 51 which are secured by means of screws 52 or the like to bosses 53 formed on bracket arm 12. In this manner the frame unit comprising plates 43 and 44 together with spacing sleeves 46 is mounted rigidly upon bracket 11.

One end of lever 41 is formed to provide an arcuate tail portion 55 having an arcuate slot 56, the remote extremity of the lever being formed to provide a sector gear 57 designed to mesh with a pinion 58 rigidly mounted upon a shaft 59 which at one end is journalled in plate 44, and which extends away therefrom through a bearing tube 61 secured to plate 43.

Rigidly mounted upon the end of shaft 59 remote from bearing plate 44 is an indicator or index finger 64 (Figures 1 and 2) designed to register with respect to graduated indices upon a dial 65. Casing wall 17 is provided with a groove or rabbet portion 66 adapted to accommodate dial 65 which is therein retained by means of bolts 67 which pass through suitable apertures in the dial and are threaded into lugs 68 provided on the inside of the casing wall.

It will be appreciated that upon actuation of lever 41 in a manner presently to be described, sector gear 57 will mesh with pinion 58 to cause rotation of shaft 59. Index finger 64 mounted on the end of shaft 59 will consequently move over dial 65 and register with the indices thereon marked to effect indication of pressure differentials between the fluid sources with which the Bourdon tubes 31 and 32 are in communication.

The front of casing 15 is closed by an observation glass 71 which is spaced from the front edge of casing wall 17 by a gasket 72 and which is locked in position by a ring 73 designed to threadedly engage the casing wall as indicated at 74. The gauge casing is thus completely sealed against the ingress of foreign matter with the result that dial 65 is at all times kept clean and the gauge mechanism is protected against excessive wear and malfunction caused by the presence of dust, grit and other foreign substances.

The pressure differentiating mechanism forming a part of the present invention interconnects the indicator actuating device and the pressure responsive assembly. The mechanism which is adapted for actuation by movement of the Bourdon tubes in response to pressure variations, is designed to automatically differentiate between the individual movements of the Bourdon tubes and to transmit such differentiated movement to the gauge indicator.

The differentiating mechanism includes a lever 79 having dual axially spaced arms 81 and 82 which are rigidly connected together by a bridge portion 83. Lever 79 is rotatably mounted upon a pivot pin 84 having a reduced threaded end 85 which is designed to be accommodated within slot 56 in tail portion 55 of lever 41. A shoulder 86, formed on pivot 84 where reduced end 85 joins the main body of the pivot, is designed to rest upon the top of lever 41 adjacent slot 56. Pivot 84 is locked in selective position with respect to slot 56 by means of a nut 89, threaded onto the end 85 of the pivot, and provided with a fin portion 91 adapted to extend within and engage the walls of slot 56 to prevent rotation of the nut with respect to tail portion 55 of lever 41. Pivot 84, remote from its threaded end 85 is provided with an enlarged head 92 which is adapted to bear against the top face of lever 81 and which is provided with a kerf 93 for accommodating a screw driver or other adjusting tool. Disposed concentrically upon pivot 84 between levers 79 and 41 is an anti-friction washer or bearing disk 94.

Lever 79 may be assembled with respect to lever 41 by passing pivot 84 through aligned apertures provided in arms 81 and 82 of lever 79 until head 92 of the pivot rests against the top face of arm 81. Washer 94 may then be mounted upon the end of pivot 84 projecting through lever arm 82, and the reduced end 85 of the pivot may be passed through slot 56 in the tail of lever 41. Nut 89 may then be threaded onto the end of pivot 84 until fin 85 is positioned to project slightly within slot 56. Finally an adjustment tool may be inserted into kerf 93 and pivot 84 rotated with the result that nut 89, restrained against rotation by accommodation of fin 91 within slot 56, will be drawn longitudinally along the threaded end of pivot 84 until lever 41 is firmly clamped between shoulder 86 of pivot 84 and the main body of nut 89.

Pivot 84 at such time will be rigidly mounted upon lever 41, and lever 79 will be rotatably mounted upon pivot 84 by virtue of the fact that the distance from the head 92 to shoulder 86 of the pivot is greater than the overall distance from the top face of lever arm 81, to the bottom face of washer 94, thereby allowing lever 79 to freely swing upon pivot 84. It is thus seen that lever 79 is rotatably mounted with respect to lever 41.

Pivot 84 may be selectively positioned with respect to slot 56 to vary the point at which lever 79 rotates with respect to lever 41 by inserting an adjusting tool within kerf 93, loosening pivot 84, reciprocating pivot 84 within slot 56 to selective position, and tightening pivot 84 by proper manipulation of the adjusting tool.

As seen in Figures 3 and 4, the free extremity of lever arm 81 is provided with a laterally offset portion 97 having an elongated slot 98. Preferably slot 98 is described from pivot 84 as a center and is substantially parallel to the path in which the free end of Bourdon tube 31 moves. Such arrangement of the slot 98 is provided for a purpose presently to appear.

Selectively locked within slot 98 by means of a nut 99 is a pivot 101 upon which is rotatably mounted one end of a link 102 designed to be axially spaced from lever arm 81 by means of an anti-friction washer 103. The construction just described in connection with pivot 101 for rotatably mounting link 102 with respect to lever arm 81 is similar to the assembly described in connection with pivot 84 and it will therefore be seen that pivot 101 may be selectively positioned within slot 98 to vary the point at which link 102 rotates with respect to lever arm 81 by proper manipulation of an adjustment tool inserted within a suitable kerf provided in the head of pivot 101.

The end of link 102 remote from pivot 101 is rotatably secured with respect to apertured lug 34 carried on the free end of Bourdon tube 31 by means of a pivot 106 the reduced end 107 of which is threaded within lug 34. The linkage just described is effective to transmit to the lever arm 81 by straight line motion any displacement suffered by the free end of Bourdon tube 31 under variation in the pressure to which the tube is responsive.

Lever arm 82 is seen to comprise a substantially straight portion 111 extending radially from pivot 84 and merging into an arcuate portion 112 described from the aperture in lug 36 as a center and forming the free end of the lever arm. The arcuate extremity of lever arm 82 is provided with an elongated slot 113 substantially radial with respect to pivot 84, and within which is selectively locked a pivot 114 by means of a nut 115.

Rotatably mounted upon pivot 114 is one end of a link 118 axially spaced from lever arm 82 by an anti-friction washer 119. The remote end of link 118 is rotatably mounted upon a pivot 121 the reduced end 122 of which is threaded into apertured lug 36 provided on the free end of Bourdon tube 32.

The construction described for rotatably mounting link 118 with respect to lever arm 112 by means of pivot 114 is similar to the assembly described in connection with pivot 84 and it will therefore be appreciated that pivot 114 may be selectively adjusted within slot 113 to vary the point at which link 118 rotates with respect to lever arm 81. Such adjustment may be made with a suitable tool inserted in a kerf provided in the head of the pivot. The linkage just described is thus effective to transmit to lever arm 81 any movement which the free end of Bourdon tube 32 may suffer under the influence of change in pressure to which the tube is subjected.

As hereinbefore pointed out, lever arms 81 and 82 are rigidly interconnected by bridge member 83 to form a single unitary lever 79. As the pivots 84, 101 and 114 which support lever 79 are all movable fulcrums, lever 79 constitutes a floating or non-fixed lever. By such construction, under particular conditions of pressure change, any one of the three pivots above mentioned may become a fixed fulcrum with respect to the other two pivots which are then adapted to serve as points of force application to the floating lever.

As previously explained, the pressure reactive characteristics of Bourdon tubes 31 and 32 are unequal with the result that when the bores of the tubes are simultaneously subjected to equal pressure variations, the free ends of the tubes will be displaced unequally, but in a fixed proportion with respect to each other, dependent upon the corresponding pressure reactive proportion or ratio existing between the tubes. In the illustrated embodiment of my invention, Bourdon tube 32 is designed with a reactive characteristic substantially twice as large as that of tube 31 with the result that the free end of tube 32 will be displaced substantially twice as far as the free end of tube 31 when the tubes react concurrently to equal pressure changes.

As also previously explained lever arms 81 and 82 are of unequal length, lever arm 82 which is linked to Bourdon tube 32 being substantially twice as long as lever arm 81 which is linked to Bourdon tube 31. The proportion existing between the reactive characteristics of the Bourdon tubes is designed to be kept at all times substantially equal to the proportion existing between the length of lever arms 81 and 82, with the longer lever arm designed to be linked with the Bourdon tube of greater reactivity. Although in the illustrated form of my invention a proportion or ratio of two to one is utilized, any other suitable proportion may be utilized if desired.

It will be observed that the ratio existing between the lengths of lever arms 81 and 82 may be selectively varied by proper adjustment of the position of pivot 114 with respect to slot 113 to vary the length of lever arm 82 while the length of lever arm 81 remains constant.

Such adjustment does not alter the pre-loading or initial tension of Bourdon tube 32 by virtue of the fact that arcuate slot 113 is described from pivot 121 as a center and movement of pivot 114 within slot 113 therefore does not cause movement of pivot 121 carried by the free end of Bourdon tube 32. The adjustment of the length of lever arm 82 is thus independent of adjustment of the reactivity of the Bourdon tubes.

Selective control of the proportion between reactivities of the Bourdon tubes may be effected by proper adjustment of pivot 101 within slot 98 to vary the pre-loading or initial tension of Bourdon tube 31 while the tension of tube 32 remains constant.

Such adjustment does not materially alter the proportion between the lengths of levers 81 and 82 since slot 98 is substantially normal to lever arm 81 and displacement of pivot 101 within slot 98 therefore does not alter the length of lever arm 82. Adjustment of the relative reactivities of the Bourdon tubes is thus independent of adjustment of the relative lengths of lever arms 81 and 82.

The proportion between the Bourdon tube reactivities may thus at all times be maintained equal to the proportion between the lengths of lever arms 81 and 82 by means of the two adjustments just described. In addition such adjustments are effective to selectively control the position of pivot 84 with respect to pivot 42 to the end that sector gear 57 may be properly positioned to cause accurate initial or zero registration of index finger 64 when the Bourdon tubes are subjected to the influence of equal pressures.

Accurate registration of index finger 64 in indication of positive and negative differential values may be assured by proper adjustment of pivot 84 within slot 56 to vary the rotational displacement of the sector gear 57 and index finger 64 in response to given displacement of pivot 84 caused by reaction of the Bourdon tubes in a manner to be presently described.

The three adjustments just described are thus effective to insure absolute accuracy and precision in the operation and consummate differential indication of the gauge at all times.

Assuming proper adjustment of the gauge mechanism, operation will occur in the following manner. With Bourdon tubes 31 and 32 reacting to equal static pressures, no actuation of any parts of the gauge mechanism will occur and index finger 64 will statically register with the "zero differential reading" on the dial face.

Should the Bourdon tubes react to dynamic pressures which at any instant are equal within the two tubes and which are changing at equal rates within the two tubes, the free end of Bourdon tube 32 will be displaced at a rate substantially twice as great as the rate at which the free end of Bourdon tube 31 is displaced since the reactivity of Bourdon tube 32 is approximately twice as great as the reactivity of Bourdon tube 31. Such displacement of the Bourdon tubes will be effective by means of links 118 and 102 to cause linear displacement of pivot 114 carried by the floating lever 79 at a rate substantially twice as great as the rate at which pivot 101 carried by the floating lever is displaced. However, displacement of pivots 114 and 101 will be substantially equal when considered rotationally with respect to pivot 84 since the lever arm carrying pivot 114 is approximately twice as long as the lever arm carrying pivot 101. Therefore under the conditions assumed, pivot 84 will remain stationary since floating lever 79 rotates about pivot 84 as a fulcrum. Sector gear 57 will thus remain stationary and index finger 64 will statically register with "zero reading" on the dial face since no differential exists between the pressures to which the gauge mechanism is responding.

Assuming that Bourdon tube 32 is reacting to a pressure which is dynamically decreasing at a more rapid rate than the pressure within tube 31, the free end of tube 32 and pivot 114 will be displaced at a rate more than twice as great as the displacement of the free end of tube 31 and pivot 101. As a result, pivot 101 becomes fixed or stationary with respect to pivot 114 and floating lever 79 is consequently rotated in a clockwise direction about pivot 101. Under such conditions pivot 84 is displaced in a manner to effect counterclockwise rotation of segment gear 57 with resulting clockwise rotation of index finger 64 to cause registration with dial 65 to the right of "zero reading". It will be appreciated that the degree of angular rotation of index finger 64 to the right of "zero reading" will be dependent upon the degree of difference between the pressures to which the Bourdon tubes react, and thus finger 64 will accurately indicate the magnitude of the pressure differential.

Similar operation of the gauge mechanism will occur if Bourdon tube 31 is reactive to a pressure which is dynamically increasing at a rate which is greater than the rate at which the pressure within tube 32 is increasing. In such case index finger will also register to the right of "zero reading." Registration of index finger 64 under either the increasing or decreasing pressure conditions just described is in the same sense or to the same side of "zero reading" since in both cases the greater of the two pressures at all times exists within Bourdon tube 31 and the lesser pressure exists within Bourdon tube 32.

A converse operation of the gauge mechanism occurs when Bourdon tube 31 is reactive to a pressure which is decreasing more rapidly than the decrease of pressure within Bourdon tube 32, or when Bourdon tube 32 is subjected to a pressure which is increasing more rapidly than the pressure within tube 31. Under such conditions movement of the free ends of Bourdon tubes 31 and 32 are effective through links 102 and 121 to cause counterclockwise rotation of floating lever 79, clockwise rotation of segment gear 57 and counterclockwise rotation of index finger 64 to effect registration of the index finger will dial 65 to the left of "zero reading". Under either the conditions of increasing or decreasing pressure just described, the index finger 64 will register in the same sense or to the same side of zero reading since the greater of the two pressures being differentiated at all times exists in Bourdon tube 32 and the lesser pressure exists within tube 31.

It will therefore be seen that index finger 64 in registering with dial 65 at all times indicates, by its sense or the side of "zero reading" on which it registers, which of the fluid sources in communication with the Bourdon tubes has a greater relative pressure value, as well as indicating the magnitude of the relative difference between the pressures being measured.

It will therefore be appreciated that the present invention provides an improved differential gauge construction having a reduced number of moving elements and mechanical couplings whereby increased accuracy and precision of low pressure differential indication is insured as a result of decreased frictional and mechanical inefficiencies. The present invention further embodies a differential gauge construction which is inexpensive to manufacture and service, and which provides a long and useful life.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. A differential gauge comprising dual pressure responsive elements having unequal pressure responsive characteristics, an indicator, a device designed to actuate said indicator, a lever mounted upon a fulcrum carried by said device, and links interconnecting said pressure responsive elements with the ends of said lever, said lever having unequal arms to compensate for the unequal pressure responsiveness of said elements.

2. In a differential gauge dual pressure responsive elements having unequal pressure responsive characteristics and designed under the influence of simultaneous equal pressure variation to suffer distortion in a fixed proportion, an indicator, a device for actuating said indicator, a lever cooperating with said device, said lever having arms of unequal length, the proportion of said lengths being equal to said first named proportion and links interconnecting said elements and said lever so as to impart movement to said device only upon application of unequal pressures to said elements.

3. A differential gauge comprising dual Bourdon tubes designed to react unequally to equal pressures, an indicator, an indicator actuating device, a lever mounted upon a fulcrum adjustably secured within a slot provided in said device, said lever having unequal arms to compensate for the unequal reactivity of said Bourdon tubes, and links interconnecting said Bourdon tubes with pivots adjustable within slots provided in the arms of said lever.

4. The mechanism described in claim 3 wherein the slot within one of said arms is arranged substantially radially with respect to the fulcrum of said lever and the slot within the other of said arms is arranged substantially parallel to the direction of movement of the Bourdon tube therewith interlinked whereby the relative reactivity of said Bourdon tubes and the relative length of said lever arms may be independently and selectively varied by proper adjustment of said pivots within said slots.

5. In a differential gauge a supporting bracket having dual bores in communication with separate sources of fluid pressure, dual Bourdon tubes having unequal pressure responsive characteristics mounted on said bracket with the bore of each tube in communication with a separate bore in said bracket, an indicator mounted upon a shaft rotatably journaled in said bracket, a rocker arm mounted upon said bracket and having a segment gear designed to mesh with a pinion gear carried by said shaft, and a mechanism interconnecting said Bourdon tubes and said rocker arm including a lever mounted upon a floating pivot carried by said rocker arm, said lever having unequal arms to compensate for the unequal pressure responsiveness of said Bourdon tubes, and links interconnecting said Bourdon tubes and said floating lever so that said rocker arm is actuated only upon reaction of said Bourdon tubes to separate fluid sources between which a pressure differential exists.

6. A differential gauge comprising two Bourdon tubes formed to react unequally to equal pressures, an indicator, and mechanism to operatively connect said indicator and tubes including a member having two arms of unequal length formed to compensate for the unequal reaction of said tubes to equal pressures so that said indicator shows no differential pressure when the pressures are equal.

7. A differential gauge comprising two Bourdon tubes formed to react unequally to equal pressures, an indicator, a rotatably mounted element operatively connected adjacent one end to said indicator, a U-shaped lever having arms of unequal length pivoted at the bight of the U to said element adjacent the other end thereof, and means connecting said Bourdon tubes and said arms respectively.

8. A differential gauge comprising dual pressure responsive elements having unequal pressure responsive characteristics, an indicator, a device designed to actuate said indicator, a lever mounted upon a fulcrum carried by said device, and links interconnecting said pressure responsive elements with the arms of said lever, said lever arms being unequal to compensate for the unequal pressure responsiveness of said elements, the ratio of the reactive characteristics of said responsive elements being equal to the ratio of the lengths of said lever arms, said links interconnecting the less reactive of said elements with the shorter lever arm and more reactive of said elements with the longer lever arm whereby simultaneous movement of said pressure responsive elements under the influence of equal pressure changes is effective to cause substantially equal angular displacement of said lever arms with respect to said fulcrum.

9. In a differential gauge a pair of Bourdon tubes having unequal pressure responsive characteristics, said Bourdon tubes being disposed in parallel planes, an indicator, an indicator actuating device, a floating lever mounted upon a pivot carried by said device, said lever having axially offset arms of unequal length, said arms being disposed one in the plane of one of said Bourdon tubes and the other in the plane of the other of said Bourdon tubes and links interconnecting said Bourdon tubes and said lever arms so that movement is imparted to said indicator actuating device only upon application of unequal pressures to said Bourdon tubes.

ERNEST H. GRAUEL.